No. 698,585. Patented Apr. 29, 1902.
A. J. THEIRING.
HUB AND AXLE BEARING.
(Application filed Dec. 9, 1901.)
(No Model.)
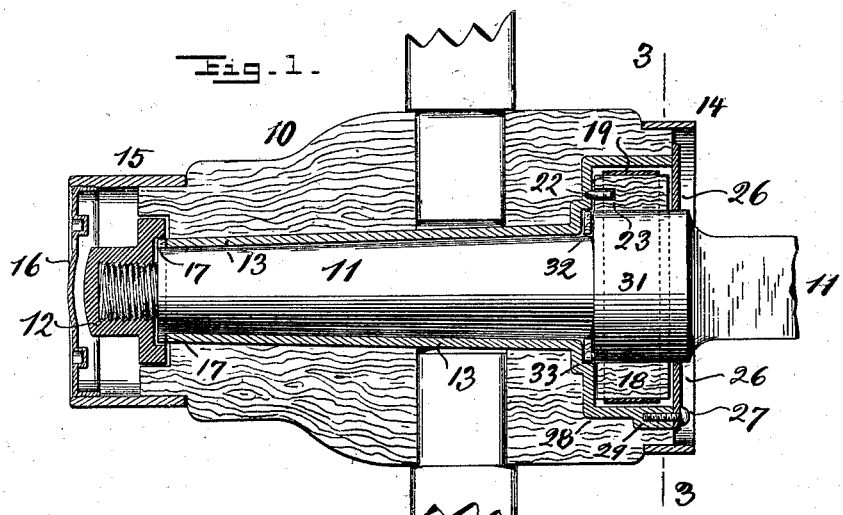
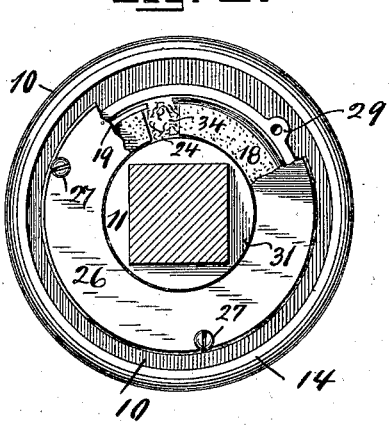
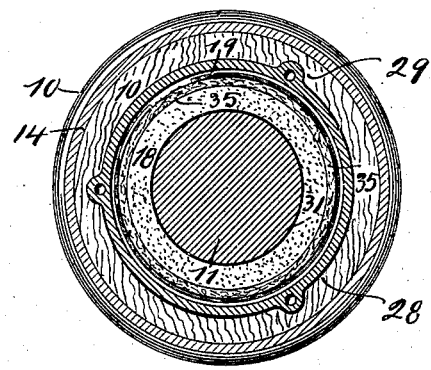
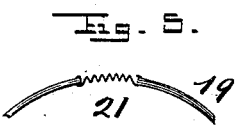
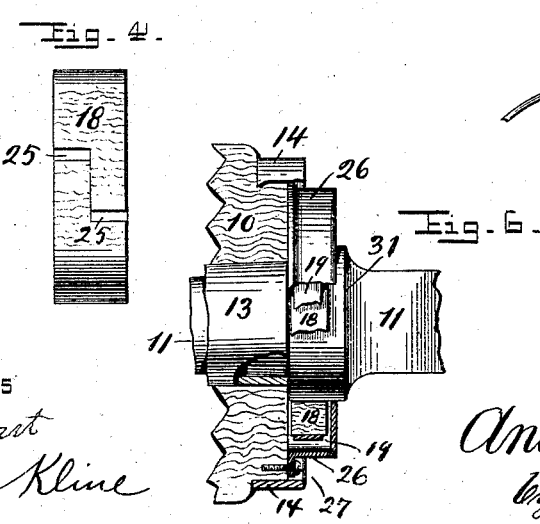
Witnesses
Wm. F. Hart
Arthur Kline
Inventor
Andrew J. Theiring
by C. Spengel atty.
THE NORRIS PETERS CO., PHOTO-LITHO., WASHINGTON, D. C.

United States Patent Office.

ANDREW J. THEIRING, OF CINCINNATI, OHIO.

HUB AND AXLE BEARING.

SPECIFICATION forming part of Letters Patent No. 698,585, dated April 29, 1902.

Application filed December 9, 1901. Serial No. 85,164. (No model.)

*To all whom it may concern:*

Be it known that I, ANDREW J. THEIRING, a citizen of the United States, residing in the city of Cincinnati, in the county of Hamilton and State of Ohio, have invented certain new and useful Improvements in Hub and Axle Bearings; and I do declare the following to be a clear, full, and exact description thereof, attention being also called to the accompanying drawings, with the reference-numerals marked thereon, which form also a part of this specification.

This invention relates to improvements in hub and axle bearings, and more particularly to the means, as hereinafter shown and described, for preventing escape and waste of the lubricant used in the bearing between hub and axle, so that a certain quantity of lubricant will suffice for a considerable length of time without requiring further supply.

The means and parts comprising this invention are devised, arranged, and constructed to be more particularly applied to such a hub and axle bearing in which the axle-journal is stationary with the hub mounted thereon rotating about the same.

In the following specification, and particularly pointed out in the claims at the end thereof, is found a full description of the invention, together with its operation, parts, and construction, which latter is also illustrated in the accompanying drawings, in which—

Figure 1 is a longitudinal central section of a hub as it appears mounted on the end of an axle. Fig. 2 is a view of the inner end of the same with parts broken away and the axle shown in section. Fig. 3 is a vertical cross-section of it on line 3 3 of Fig. 1, showing certain modifications. Fig. 4 is a side elevation of a modified shape of the washer used. Fig. 5 shows a modified construction of the device used for holding the washer in contact with the axle. Fig. 6 shows a modified construction for holding the parts in position.

In the drawings, 10 is the hub, of any suitable customary shape, its bore fitted to the end of a non-rotary axle 11, to which it is held by a suitable screw connection—as, for instance, by a nut 12. In case of a wooden hub, as here shown, a metallic box 13 is provided, lining the bore of the hub, which, however, is not needed when this latter is all metal. 14 is the hub-band at the rear or inner end of the hub, and 15 is the similar contrivance at the outer or front end of the hub, the space surrounded by it and occupied by nut 12 being closed by a suitable dust-cap 16. All these parts are to be of any suitable approved construction.

As before stated, the object of this my present invention is to prevent escape of the lubricant applied to the bearing between the rotating hub and its non-rotary axle and at the ends of such bearing where the axle passes through the hub. At the front end this problem presents no particular difficulty, since by means of nut 12 and an interposed washer or packing 17 a tight joint can be readily maintained. At the rear end this may not be done with ordinary means, but is readily accomplished with the devices provided by my invention. These devices consist, first, of a washer 18, surrounding the axle at the rear end of its bearing and held in contact therewith by a ring or band 19, having a tendency to contract, whereby such washer is caused to constantly remain in touch with the axle notwithstanding the reduction due to wear between these parts, thus preventing escape of lubricant, which would otherwise occur through the gap caused by such reduction. For such purpose this ring may be of spring-steel, or it may be a band, as shown in Fig. 5, the contracting force being supplied by a spring 21, engaging and connecting the open ends of this band. The washer so surrounded by this contracting-band is held to the hub, so as to rotate therewith around the non-rotary axle by any suitable means which may be a projection on one of these parts occupying a depression in the other. In this case this projection is in shape of a suitable pin 22, carried by the hub and occupying a corresponding socket-hole 23 in the washer. Both ring 19 as well as the washer are open and with a space between their separated ends in order to prevent in case of ring 19 an interference with the contractile function of such ring and in case of washer 18 to permit the same to yield to the pressure imparted by this contraction and maintain at the same time close contact with the axle to compensate for its wear. This open cut of the washer is shown in Fig. 2 at 24 and extends straight through the entire width or depth of it. In Fig. 4 this cut is differently arranged, as best shown at 25, and while it does not extend through the washer on a straight line it nevertheless is such as to prevent interference with the approach of its separated ends. These means as described occupy an annular recess at the inner end of the hub and which recess may be contained in such inner end formed by enlarging the bore of the hub thereat, or it may be contained in a correspondingly-shaped annular plate 26, as shown in Fig. 6. In the first case this plate serves to close the recess in this end of the hub, and in all cases it serves to confine the parts within endwise in position. It is preferably affixed to the end of the hub, which may be done with screws 27. Where the recess is to be formed in the end of the hub, it may be done by enlarging box 13, where one is used, as shown at 28, in which case the holes 29 for screws 27 may also be provided in the edge of the enlarged box. There is generally a shoulder at the inner end of the axle-bearing formed by an enlargement at 31 of the axle and which defines the position of the wheel, which is done by the hub being held against such shoulder by means of nut 12. Washer 18 is by preference placed so as to rest on and bear peripherically against this enlarged part 31 of the axle. Between this shoulder on this latter and the hub there is an additional washer 32, occupying a recess 33, also formed in the box, as shown. The washers shown are preferably all of wood with the grain or fiber disposed parallel to the axis of the hub, as shown for washer 18. This material while not as soft as leather is sufficiently soft for the purpose, but does not wear away as fast as the former and is also sufficiently porous to absorb and retain oil. It becomes necessary to prevent escape of lubricant through the space between the separated ends of this washer 18 in all cases, which is done by packing 34 of any suitable yielding material, like cotton, for instance, which does not interfere with the contracting movement of the washer or ring 19. The same object may be obtained by placing this packing all around said washer, as shown at 35 in Fig. 3, and between this washer and band 19, surrounding it.

Having described my invention, I claim as new—

1. In a hub and axle bearing, the combination of a non-rotary axle-journal, a rotary hub fitted thereto with its bore enlarged at its inner end to form thereat a recess between axle and hub, a washer occupying this recess, being at the same time with its inner side in contact with the axle which it surrounds thereat, a band having a tendency to contract surrounding this washer which latter is provided with a cut disposed in a manner to permit it to yield to the pressure imparted by such contraction and means to hold this washer to the hub so as to cause the same to rotate therewith.

2. In a hub and axle bearing, the combination of a non-rotary axle-journal, a rotary hub fitted thereto with its bore enlarged at its inner end to form thereat a recess between axle and hub, a washer occupying this recess, being at the same time with its inner side in contact with the axle which it surrounds thereat, a band having a tendency to contract surrounding this washer which latter is provided with a cut disposed in a manner to permit it to yield to the pressure imparted by such contraction, and an annular plate to close the recess at the inner end of the hub to confine the washer therein.

3. In a hub and axle bearing, the combination of a box lining the bore of the hub, the same being enlarged at one end to form a recess, a washer surrounding the axle, an elastic ring surrounding this washer, both occupying the recess mentioned, both being open with a space between their separated ends to permit contraction, a pin 22 projecting into the recess of the box engaging an opening in the washer to cause the same to rotate with the hub and an annular plate 26 affixed to the edges of the enlarged part of the box to close the recess therein.

4. In a hub and axle bearing, the combination of a rotary hub having its bearing at its outer end closed in a manner to prevent escape of lubricant therethrough and with a recess at its inner end, a non-rotary axle having an enlargement at the inner end of the journal thereon and within the recess of the hub, an open washer mounted on this enlarged part of the axle and a ring having contracting properties surrounding this washer and both occupying the recess at the inner end of the hub.

5. In a hub and axle bearing, the combination of a non-rotary axle-journal, a rotary hub fitted thereto with its bore enlarged at its inner end to form thereat a recess between axle and hub, a washer occupying this recess, being at the same time with its inner side in contact with the axle which it surrounds thereat, a band having a tendency to contract surrounding this washer which latter is provided with a cut disposed in a manner to permit it to yield to the pressure imparted by such contraction and packing of yielding material between the washer and the band to prevent escape of lubricant through the open cut of the washer.

6. In a hub and axle bearing, the combination of a non-rotary axle-journal, a rotary hub fitted thereto with its bore enlarged at its inner end to form thereat a recess between axle and hub, a washer occupying this recess, being at the same time with its inner side in contact with the axle which it surrounds thereat, a band having a tendency to contract surrounding this washer, which latter is provided with a cut disposed in a manner to permit it to yield to the pressure imparted by such contraction and packing in the cut of the washer to prevent escape of lubricant therethrough.

In testimony whereof I hereunto set my hand in the presence of two witnesses.

ANDREW J. THEIRING.

Witnesses:
C. SPENGEL,
ARTHUR KLINE.